United States Patent
Shen et al.

(10) Patent No.: US 11,107,246 B2
(45) Date of Patent: Aug. 31, 2021

(54) METHOD AND DEVICE FOR CAPTURING TARGET OBJECT AND VIDEO MONITORING DEVICE

(71) Applicant: HANGZHOU HIKVISION DIGITAL TECHNOLOGY CO., LTD., Hangzhou (CN)

(72) Inventors: Lin Shen, Hangzhou (CN); Hongxiang Tong, Hangzhou (CN); Linjie Shen, Hangzhou (CN); Shangdi Zhang, Hangzhou (CN)

(73) Assignee: HANGZHOU HIKVISION DIGITAL TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 16/623,229

(22) PCT Filed: Jun. 13, 2018

(86) PCT No.: PCT/CN2018/090992
§ 371 (c)(1),
(2) Date: Dec. 16, 2019

(87) PCT Pub. No.: WO2018/228413
PCT Pub. Date: Dec. 20, 2018

(65) Prior Publication Data
US 2020/0167959 A1    May 28, 2020

(30) Foreign Application Priority Data

Jun. 16, 2017 (CN) .......................... 201710459265.1

(51) Int. Cl.
*G06T 7/80* (2017.01)
*G06T 7/70* (2017.01)
(Continued)

(52) U.S. Cl.
CPC .................. *G06T 7/80* (2017.01); *G06T 7/20* (2013.01); *G06T 7/60* (2013.01); *G06T 7/70* (2017.01);
(Continued)

(58) Field of Classification Search
CPC ....... G08B 13/19643; G06T 7/80; G06T 7/70; G06T 7/20; G06T 7/60; H04N 5/23238;
(Continued)

(56) References Cited

U.S. PATENT DOCUMENTS 6,108,035 A *  8/2000  Parker ...................... H04N 7/15
                                                         348/14.16
6,215,519 B1 *  4/2001  Nayar .............. G08B 13/19608
                                                          348/148
(Continued)

FOREIGN PATENT DOCUMENTS

CN         1543200        11/2004
CN       101969548         2/2011
(Continued)

OTHER PUBLICATIONS

International Search Report and Written Opinion issued in corresponding PCT Application No. PCT/CN2018/090992, dated in Sep. 3, 2018 (English translation of International Search Report provided).
(Continued)

*Primary Examiner* — David E Harvey
(74) *Attorney, Agent, or Firm* — Norton Rose Fulbright US LLP

(57) ABSTRACT

A method and an apparatus for capturing a target object and a video monitoring device are disclosed. The method includes: detecting target objects in a current panoramic video frame acquired by a panoramic camera; determining detail camera position information corresponding to each of
(Continued)

the target objects, and determining a magnification corresponding to the target objects; performing block processing on the target objects to obtain at least one target block; for each target block, identifying first target objects, at edge positions, among target objects included in the target block, and determining, based on the first target objects, the detail camera position information and the magnification corresponding to the target block; for each target block, controlling the detail camera to adjust its position and magnification based on the detail camera position information and the magnification corresponding to the target block, and controlling the adjusted detail camera to capture the target block.

16 Claims, 4 Drawing Sheets

(51) Int. Cl.
*H04N 5/232* (2006.01)
*G06T 7/20* (2017.01)
*G06T 7/60* (2017.01)
*H04N 7/18* (2006.01)

(52) U.S. Cl.
CPC ..... *H04N 5/23238* (2013.01); *H04N 5/23296* (2013.01); *H04N 5/23299* (2018.08); *H04N 7/183* (2013.01); *G06T 2207/10016* (2013.01); *G06T 2207/30232* (2013.01); *G06T 2207/30244* (2013.01)

(58) Field of Classification Search
CPC . H04N 5/23299; H04N 5/23296; H04N 7/183
See application file for complete search history.

(56) References Cited

U.S. PATENT DOCUMENTS

| | | | | |
|---|---|---|---|---|
| 6,404,455 | B1* | 6/2002 | Ito | G08B 13/19602 348/169 |
| 8,306,359 | B2* | 11/2012 | Kim | H04N 1/3873 382/282 |
| 8,411,128 | B2* | 4/2013 | Kang | H04N 5/23296 348/14.04 |
| 9,215,358 | B2* | 12/2015 | Sablak | G08B 13/19604 |
| 9,489,726 | B2* | 11/2016 | Boitard | G06T 5/009 |
| 9,842,259 | B2* | 12/2017 | Yamazaki | G06K 9/00771 |
| 10,026,284 | B2* | 7/2018 | Takiguchi | G06T 7/20 |
| 10,652,473 | B2* | 5/2020 | Tsubusaki | H04N 5/232123 |
| 10,798,306 | B1* | 10/2020 | Johansen | H04N 5/2628 |
| 2005/0244033 | A1* | 11/2005 | Ekin | H04N 1/2187 382/103 |
| 2006/0012681 | A1* | 1/2006 | Fujii | H04N 7/181 348/169 |
| 2006/0056056 | A1* | 3/2006 | Ahiska | G08B 13/19643 359/690 |
| 2006/0126738 | A1* | 6/2006 | Boice | H04N 5/23299 375/240.16 |
| 2007/0029030 | A1* | 2/2007 | McCowin | B29C 70/32 156/173 |
| 2007/0035627 | A1* | 2/2007 | Cleary | G08B 13/19663 348/159 |
| 2007/0035628 | A1* | 2/2007 | Kanai | H04N 5/23219 348/159 |
| 2007/0291104 | A1* | 12/2007 | Petersen | H04N 5/23296 348/14.01 |
| 2008/0205869 | A1* | 8/2008 | Nose | H04N 5/232941 396/77 |
| 2009/0015658 | A1* | 1/2009 | Enstad | H04N 21/4788 348/14.08 |
| 2009/0041297 | A1* | 2/2009 | Zhang | G06T 7/251 382/103 |
| 2010/0002070 | A1* | 1/2010 | Ahiska | H04N 7/181 348/36 |
| 2010/0002071 | A1* | 1/2010 | Ahiska | H04N 5/23216 348/36 |
| 2010/0141767 | A1* | 6/2010 | Mohanty | G08B 13/19643 348/159 |
| 2010/0214445 | A1* | 8/2010 | Chronqvist | H04N 5/23219 348/231.99 |
| 2010/0265331 | A1* | 10/2010 | Tanaka | H04N 5/23299 348/159 |
| 2011/0128385 | A1* | 6/2011 | Bedros | H04N 5/23299 348/164 |
| 2011/0149120 | A1* | 6/2011 | Kubota | H04N 5/23296 348/240.99 |
| 2011/0267499 | A1* | 11/2011 | Wan | H04N 5/23254 348/231.99 |
| 2011/0285807 | A1* | 11/2011 | Feng | H04N 5/23299 348/14.08 |
| 2011/0310219 | A1* | 12/2011 | Kim | H04N 5/247 348/36 |
| 2012/0075413 | A1* | 3/2012 | Hamada | H04N 5/2628 348/36 |
| 2012/0154522 | A1* | 6/2012 | Yoo | H04N 5/247 348/36 |
| 2012/0257064 | A1* | 10/2012 | Kim | G08B 13/19626 348/159 |
| 2013/0076945 | A1* | 3/2013 | Nagata | H04N 5/23219 348/240.2 |
| 2013/0162838 | A1* | 6/2013 | Huang | H04N 7/181 348/169 |
| 2013/0300822 | A1* | 11/2013 | Mills | H04N 5/232945 348/36 |
| 2014/0104376 | A1* | 4/2014 | Chen | G08B 13/19643 348/36 |
| 2014/0139680 | A1* | 5/2014 | Huang | G06K 9/00771 348/159 |
| 2014/0176612 | A1* | 6/2014 | Tamura | G06T 3/40 345/660 |
| 2015/0244991 | A1* | 8/2015 | Noda | H04N 5/247 348/158 |
| 2016/0078298 | A1* | 3/2016 | Wu | G08B 13/19643 348/143 |
| 2016/0127695 | A1* | 5/2016 | Zhang | H04N 7/185 348/143 |
| 2016/0379085 | A1* | 12/2016 | Dodballapur | G06K 9/6202 382/218 |
| 2017/0094184 | A1* | 3/2017 | Gao | G01S 3/7864 |
| 2018/0070010 | A1* | 3/2018 | Wang | G06T 3/4007 |
| 2018/0342070 | A1* | 11/2018 | Chen | G06K 9/00744 |
| 2018/0376074 | A1* | 12/2018 | Gumpert | G08B 13/1963 |
| 2019/0066335 | A1* | 2/2019 | Dahlstrom | H04N 5/23296 |

FOREIGN PATENT DOCUMENTS

| | | | | |
|---|---|---|---|---|
| CN | 102148965 | | 8/2011 | |
| CN | 102342099 | | 2/2012 | |
| DE | 4220316 | A1 * | 1/1993 | ......... H04N 5/23206 |
| EP | 1635573 | A2 * | 3/2006 | ............. H04N 5/232 |
| WO | WO-2007014216 | A2 * | 2/2007 | ............. H04N 7/181 |
| WO | WO 2015/151095 | | 10/2015 | |

OTHER PUBLICATIONS

Extended European Search Report issued in Corresponding European Application No. 18817790.1, dated Jun. 2, 2020.
Zhao et al. "Tracking Multiple Humans in Complex Situations" *IEEE Transactions on Pattern Analysis and Machine Intelligence* 2004, 26(9), 1208-1221.

* cited by examiner

METHOD AND DEVICE FOR CAPTURING TARGET OBJECT AND VIDEO MONITORING DEVICE

CROSS-REFERENCE TO RELATED APPLICATIONS

The present application is a national phase under 35 U.S.C. § 371 of International Application No. PCT/CN2018/090992, filed Jun. 13, 2018, which claims priority to Chinese Patent Application No. 201710459265.1 filed with the China National Intellectual Property Administration on Jun. 16, 2017 and entitled "METHOD AND APPARATUS FOR CAPTURING TARGET OBJECT AND VIDEO MONITORING DEVICE", each of which are incorporated herein by reference in their entirety.

TECHNICAL FIELD

The present application relates to the field of image processing technology, and in particular to a method and an apparatus for capturing a target object and a video monitoring device.

BACKGROUND

With the continuous development of the video monitoring technology, video monitoring devices have been widely used in the security field. In a monitoring scene, a monitoring device is usually required to be able to monitor a wide range of region and capture a high-definition monitoring image.

However, when a panoramic camera with a large monitoring range (such as a gun camera) is used for monitoring, a target object is usually small in the monitoring image, resulting in a problem such as unclear details of the target object. When a detail camera (such as a dome camera) is used for monitoring, a clear target object can usually be obtained in the monitoring image, but the monitoring range is often smaller. Therefore, in the existing video monitoring device, there is a problem that the monitoring range and the definition of the target object cannot both be obtained.

SUMMARY

The objective of the embodiments of the present application is to provide a method and an apparatus for capturing a target object and a video monitoring device, to improve the definition of the target object on the premise of ensuring a monitoring range. The following specific technical solutions are provided.

In a first aspect, an embodiment of the present application provides a method for capturing a target object. The method includes:

detecting target objects in a current panoramic video frame acquired by a panoramic camera, and determining first position information and a size of each of the target objects in the current panoramic video frame;

determining detail camera position information corresponding to each of the target objects based on the first position information of the target object and a pre-constructed position mapping relationship between the panoramic camera and a detail camera, and determining a magnification corresponding to each of the target objects based on the size of the target object;

performing block processing on the target objects based on the detail camera position information and the magnification corresponding to each of the target objects, to obtain at least one target block; wherein, each target block comprises one or more target objects;

for each target block, identifying first target objects, at edge positions, among target objects comprised in the target block; determining detail camera position information corresponding to the target block based on detail camera position information corresponding to each of the first target objects; and determining a magnification corresponding to the target block based on a magnification corresponding to each of the first target objects; and for each target block, controlling the detail camera to adjust its position and magnification based on the detail camera position information and the magnification corresponding to the target block, and controlling the adjusted detail camera to capture the target block.

Optionally, the step of determining a magnification corresponding to each of the target objects based on the size of the target object comprises:

for each of the target objects, determining, based on the size of the target object, a corresponding angle of view; and determining a magnification corresponding to the angle of view based on a preset correspondence between magnifications and angles of view, and using the determined magnification as the magnification corresponding to the target object.

Optionally, before, for each target block, controlling the detail camera to adjust its position and magnification based on the detail camera position information and the magnification corresponding to the target block, and controlling the adjusted detail camera to capture the target block, the method further comprises:

setting an initial value for the number of times that each target block has been captured;

the step of, for each target block, controlling the detail camera to adjust its position and magnification based on the detail camera position information and the magnification corresponding to the target block, and controlling the adjusted detail camera to capture the target block, comprises:

determining whether there exists a target block that has not been captured based on the number of times that each target block has been captured;

if there are target blocks that have not been captured, calculating a capturing priority of each of the target blocks that have not been captured; for a target block with a maximum capturing priority, controlling the detail camera to adjust its position and magnification based on the detail camera position information and the magnification corresponding to the target block, and controlling the adjusted detail camera to capture the target block; and updating the number of times that the target block has been captured, and returning to the step of determining whether there exists a target block that has not been captured based on the number of times that each target block has been captured.

Optionally, the step of calculating a capturing priority of each of the target blocks that have not been captured comprises:

for each of the target blocks that have not been captured, calculating the capturing priority of the target block based on attribute information and a weight corresponding to the attribute information of each of target objects comprised in the target block and/or a position difference between a position of the target block and a position of a last captured target block and a weight corresponding to the position difference; wherein, the attribute information of any one of the target objects comprises at least one of: a moving direction, the number of times that this target object has been captured and leaving time.

Optionally, in case that for each of the target blocks that have not been captured, the capturing priority of the target block is calculated based on the attribute information and the weight corresponding to the attribute information of each of the target objects comprised in the target block and the position difference between the position of the target block and the position of the last captured target block and the weight corresponding to the position difference, and the attribute information of any one of the target objects comprises the moving direction, the number of times that this target object has been captured and the leaving time, before for each of the target blocks that have not been captured, calculating the capturing priority of the target block based on the attribute information and the weight corresponding to the attribute information of each of the target objects comprised in the target block and the position difference between the position of the target block and the position of the last captured target block and the weight corresponding to the position difference, the method further comprises:

detecting each of the target objects comprised in the target block, to determine that the moving direction of each of the target objects is a direction of the target object being directly toward the panoramic camera or a direction of the target object being not directly toward the panoramic camera;

determining speed information of each of the target objects comprised in the target block, and determining the leaving time of each of the target objects comprised in the target block based on the moving direction, the speed information and the first position information of this target object in the current panoramic video frame; and determining the position difference between the position of the target block and the position of the last captured target block based on the first position information of the target block in the current panoramic video frame and the first position information of the last captured target block in the current panoramic video frame.

Optionally, the step of, for each of the target blocks that have not been captured, calculating the capturing priority of the target block based on the attribute information and the weight corresponding to the attribute information of each of the target objects comprised in the target block and the position difference between the position of the target block and the position of the last captured target block and the weight corresponding to the position difference, comprises:

for any one of the target blocks that have not been captured, calculating the capturing priority W of the target block by the following formula:

$$W = \sum_{1}^{n}\left(fw_1 + \frac{1}{c+1}w_2 + \frac{1}{t+0.01}w_3\right) + \frac{1}{d+0.01}w_4,$$

wherein, n is the number of target objects comprised in the target block; f is a moving direction of any one of the target objects; when the moving direction of the target object is a direction of the target object being directly toward the panoramic camera, f=1; when the moving direction of the target object is a direction of the target object being not directly toward the panoramic camera, f=0; $w_1$ is a weight corresponding to the moving direction; c is the number of times that the target object has been captured; $w_2$ is a weight corresponding to the number of times that the target object has been captured; t is leaving time of the target object; $w_3$ is a weight corresponding to the leaving time; d is a position difference between a position of the target block and a position of a last captured target block; and $w_4$ is a weight corresponding to the position difference.

Optionally, the step of determining a magnification corresponding to the target block based on a magnification corresponding to each of the first target objects comprises:

using a maximum value in the magnifications corresponding to the first target objects as the magnification corresponding to the target block, or using a comprehensive magnification obtained by multiplying the magnification of each of the first target objects by a corresponding weight as the magnification corresponding to the target block.

Optionally, the step of detecting target objects in a current panoramic video frame acquired by a panoramic camera comprises:

detecting target objects that are present in the current panoramic video frame but not present in a previous panoramic video frame acquired by the panoramic camera.

In a second aspect, an embodiment of the present application provides an apparatus for capturing a target object. The apparatus includes:

a first detection module, configured for: detecting target objects in a current panoramic video frame acquired by a panoramic camera, and determining first position information and a size of each of the target objects in the current panoramic video frame;

a first determination module, configured for: determining detail camera position information corresponding to each of the target objects based on the first position information of the target object and a pre-constructed position mapping relationship between the panoramic camera and a detail camera, and determining a magnification corresponding to each of the target objects based on the size of the target object;

a processing module, configured for: performing block processing on the target objects based on the detail camera position information and the magnification corresponding to each of the target objects, to obtain at least one target block; wherein, each target block comprises one or more target objects;

an identification module, configured for: for each target block, identifying first target objects, at edge positions, among target objects comprised in the target block; determining detail camera position information corresponding to the target block based on detail camera position information corresponding to each of the first target objects; and determining a magnification corresponding to the target block based on a magnification corresponding to each of the first target objects; and a control module, configured for: for each target block, controlling the detail camera to adjust its position and magnification based on the detail camera position information and the magnification corresponding to the target block, and controlling the adjusted detail camera to capture the target block.

Optionally, the first determination module comprises:

a first determination sub-module, configured for: for each of the target objects, determining, based on the size of the target object, a corresponding angle of view, and a second determination sub-module, configured for: determining a magnification corresponding to the angle of view based on a preset correspondence between magnifications and angles of view, and using the determined magnification as the magnification corresponding to the target object.

Optionally, the apparatus further comprises:

a setting module, configured for: setting an initial value for the number of times that each target block has been captured;

the control module comprises:

a judgment submodule, configured for: determining whether there exists a target block that has not been captured based on the number of times that each target block has been captured;

a control submodule, configured for: when the judgment submodule determines that there are target blocks that have not been captured, calculating a capturing priority of each of the target blocks that have not been captured; for a target block with a maximum capturing priority, controlling the detail camera to adjust its position and magnification based on the detail camera position information and the magnification corresponding to the target block, and controlling the adjusted detail camera to capture the target block; and an update submodule, configured for: updating the number of times that the target block has been captured, and triggering the judgment submodule.

Optionally, the control submodule is specifically configured for: for each of the target blocks that have not been captured, calculating the capturing priority of the target block based on attribute information and a weight corresponding to the attribute information of each of target objects comprised in the target block and/or a position difference between a position of the target block and a position of a last captured target block and a weight corresponding to the position difference; wherein, the attribute information of any one of the target objects comprises at least one of: a moving direction, the number of times that this target object has been captured and leaving time.

Optionally, when the control submodule is specifically configured for: for each of the target blocks that have not been captured, calculating the capturing priority of the target block based on the attribute information and the weight corresponding to the attribute information of each of the target objects comprised in the target block and the position difference between the position of the target block and the position of the last captured target block and the weight corresponding to the position difference, and the attribute information of any one of the target objects comprises the moving direction, the number of times that this target object has been captured and the leaving time, the apparatus further comprises:

a second detection module, configured for: detecting each of the target objects comprised in the target block, to determine that the moving direction of each of the target objects is a direction of the target object being directly toward the panoramic camera or a direction of the target object being not directly toward the panoramic camera;

a second determination module, configured for: determining speed information of each of the target objects comprised in the target block, and determining the leaving time of each of the target objects comprised in the target block based on the moving direction, the speed information and the first position information of this target object in the current panoramic video frame; and a third determination module, configured for: determining the position difference between the position of the target block and the position of the last captured target block based on the first position information of the target block in the current panoramic video frame and the first position information of the last captured target block in the current panoramic video frame.

Optionally, the control submodule is specifically configured for: for any one of the target blocks that have not been captured, calculating the capturing priority W of the target block by the following formula:

$$W = \sum_{1}^{n}\left(fw_1 + \frac{1}{c+1}w_2 + \frac{1}{t+0.01}w_3\right) + \frac{1}{d+0.01}w_4,$$

wherein, n is the number of target objects comprised in the target block; f is a moving direction of any one of the target objects; when the moving direction of the target object is a direction of the target object being directly toward the panoramic camera, f=1; when the moving direction of the target object is a direction of the target object being not directly toward the panoramic camera, f=0; $w_1$ is a weight corresponding to the moving direction; c is the number of times that the target object has been captured; $w_2$ is a weight corresponding to the number of times that the target object has been captured; t is leaving time of the target object; $w_3$ is a weight corresponding to the leaving time; d is a position difference between a position of the target block and a position of a last captured target block; and $w_4$ is a weight corresponding to the position difference.

Optionally, the first determination module is specifically configured for: using a maximum value in the magnifications corresponding to the first target objects as the magnification corresponding to the target block, or using a comprehensive magnification obtained by multiplying the magnification of each of the first target objects by a corresponding weight as the magnification corresponding to the target block.

Optionally, the first detection module is configured for: detecting target objects that are present in the current panoramic video frame but not present in a previous panoramic video frame acquired by the panoramic camera.

In a third aspect, an embodiment of the present application provides a video monitoring device including: a panoramic camera, a detail camera and a processor; wherein, the panoramic camera is configured for: acquiring a current panoramic video frame and sending the current panoramic video frame to the processor;

the processor is configured for: detecting target objects in the current panoramic video frame, and determining first position information and a size of each of the target objects in the current panoramic video frame; determining detail camera position information corresponding to each of the target objects based on the first position information of the target object and a pre-constructed position mapping relationship between the panoramic camera and the detail camera, and determining a magnification corresponding to each of the target objects based on the size of the target object; performing block processing on the target objects based on the detail camera position information and the magnification corresponding to each of the target objects, to obtain at least one target block; wherein, each target block comprises one or more target objects; for each target block, identifying first target objects, at edge positions, among target objects comprised in the target block; determining detail camera position information corresponding to the target block based on detail camera position information corresponding to each of the first target objects; and determining a magnification corresponding to the target block based on a magnification corresponding to each of the first target objects; and for each target block, sending the detail camera position information and the magnification corresponding to the target block to the detail camera; and the detail camera is configured for: adjusting its own position and magnification based on received detail camera position information and magnification corresponding to the target block, and capturing the target block.

Optionally, the processor is specifically configured for: for each of the target objects, determining, based on the size of the target object, a corresponding angle of view; and determining a magnification corresponding to the angle of view based on a preset correspondence between magnifications and angles of view, and using the determined magnification as the magnification corresponding to the target object.

Optionally, the processor is further configured for: setting an initial value for the number of times that each target block has been captured;

the processor is specifically configured for: determining whether there exists a target block that has not been captured based on the number of times that each target block has been captured; if there are target blocks that have not been captured, calculating a capturing priority of each of the target blocks that have not been captured; for a target block with a maximum capturing priority, sending the detail camera position information and the magnification corresponding to the target block to the detail camera; updating the number of times that the target block has been captured, and returning to the determining whether there exists a target block that has not been captured based on the number of times that each target block has been captured; and the detail camera is specifically configured for: adjusting its own position and magnification based on received detail camera position information and magnification corresponding to the target block, and capturing the target block.

Optionally, the processor is specifically configured for: for each of the target blocks that have not been captured, calculating the capturing priority of the target block based on attribute information and a weight corresponding to the attribute information of each of target objects comprised in the target block and/or a position difference between a position of the target block and a position of a last captured target block and a weight corresponding to the position difference; wherein, the attribute information of any one of the target objects comprises at least one of: a moving direction, the number of times that this target object has been captured and leaving time.

Optionally, in case that the processor, for each of the target blocks that have not been captured, calculates the capturing priority of the target block based on the attribute information and the weight corresponding to the attribute information of each of the target objects comprised in the target block and the position difference between the position of the target block and the position of the last captured target block and the weight corresponding to the position difference, and the attribute information of any one of the target objects comprises the moving direction, the number of times that this target object has been captured and the leaving time, the processor is further configured for: detecting each of the target objects comprised in the target block, to determine that the moving direction of each of the target objects is a direction of the target object being directly toward the panoramic camera or a direction of the target object being not directly toward the panoramic camera; determining speed information of each of the target objects comprised in the target block, and determining the leaving time of each of the target objects comprised in the target block based on the moving direction, the speed information and the first position information of this target object in the current panoramic video frame; and determining the position difference between the position of the target block and the position of the last captured target block based on the first position information of the target block in the current panoramic video frame and the first position information of the last captured target block in the current panoramic video frame.

Optionally, the processor is specifically configured for: for any one of the target blocks that have not been captured, calculating the capturing priority W of the target block by the following formula:

$$W = \sum_{1}^{n} \left( fw_1 + \frac{1}{c+1} w_2 + \frac{1}{t+0.01} w_3 \right) + \frac{1}{d+0.01} w_4,$$

wherein, n is the number of target objects comprised in the target block; f is a moving direction of any one of the target objects; when the moving direction of the target object is a direction of the target object being directly toward the panoramic camera, f=1; when the moving direction of the target object is a direction of the target object being not directly toward the panoramic camera, f=0; $w_1$ is a weight corresponding to the moving direction; c is the number of times that the target object has been captured; $w_2$ is a weight corresponding to the number of times that the target object has been captured; t is leaving time of the target object; $w_3$ is a weight corresponding to the leaving time; d is a position difference between a position of the target block and a position of a last captured target block; and $w_4$ is a weight corresponding to the position difference.

Optionally, the processor is specifically configured for: using a maximum value in the magnifications corresponding to the first target objects as the magnification corresponding to the target block, or using a comprehensive magnification obtained by multiplying the magnification of each of the first target objects by a corresponding weight as the magnification corresponding to the target block.

Optionally, the processor is configured for: detecting target objects that are present in the current panoramic video frame but not present in a previous panoramic video frame acquired by the panoramic camera.

In a fourth aspect, the present application provides a storage medium. The storage medium is configured for storing executable program codes which, when executed, implement the method for capturing a target object in the first aspect of the present application.

In a fifth aspect, the present application provides an application program. The application program, when executed, implements the method for capturing a target object in the first aspect of the present application.

The embodiments of the present application provide a method and an apparatus for capturing a target object and a video monitoring device. The method includes: detecting target objects in a current panoramic video frame acquired by a panoramic camera, and determining a size and first position information of each of the target objects in the current panoramic video frame; determining detail camera position information corresponding to each of the target objects based on the first position information of the target object and a pre-constructed position mapping relationship between the panoramic camera and a detail camera, and determining a magnification corresponding to each of the target objects based on the size of the target object; performing block processing on the target objects based on the detail camera position information and the magnification corresponding to each of the target objects, to obtain at least one target block; wherein, each target block includes one or more target objects; for each target block, identifying first target objects, at edge positions, among target objects included in the target block; determining, based on detail camera position information corresponding to each of the first target objects, detail camera position information corresponding to the target block; determining, based on a magnification corresponding to each of the first target objects, a magnification corresponding to the target block; and, for each target block, controlling the detail camera to adjust its position and magnification based on the detail camera position information and the magnification corresponding to the target block, and controlling the adjusted detail camera to capture the target block.

In the embodiment of the present application, when target objects in the panoramic camera are detected, the block processing can be performed on the target objects to obtain multiple target blocks; and for each of the target blocks, the detail camera can be adjusted based on the position information, size and the like of the target object(s) included in the target block, so that the detail camera captures this target block through a position and magnification corresponding to this target block. In this way, it is possible to improve the capturing efficiency and the definition of target objects on the premise of ensuring the monitoring range.

BRIEF DESCRIPTION OF THE DRAWINGS

In order to more clearly describe the technical solutions of the embodiments of the present application and the prior art, accompanying drawings that need to be used in embodiments and the prior art will be briefly described below. Obviously, accompanying drawings described below are for only some of embodiments of the present application; those skilled in the art may also obtain other accompanying drawings based on these accompanying drawings without any creative efforts.

DETAILED DESCRIPTION

The technical solutions in the embodiments of the present application will be described clearly and completely below in combination with the accompanying drawings in the embodiments of the present application. Obviously, the described embodiments are merely a part of and not all of the embodiments of the present application. All other embodiments obtained by those skilled in the art based on the embodiments of the present application without creative efforts shall fall within the scope of protection of the present application.

The present application will be described in detail below by specific embodiments.

Figure 1:
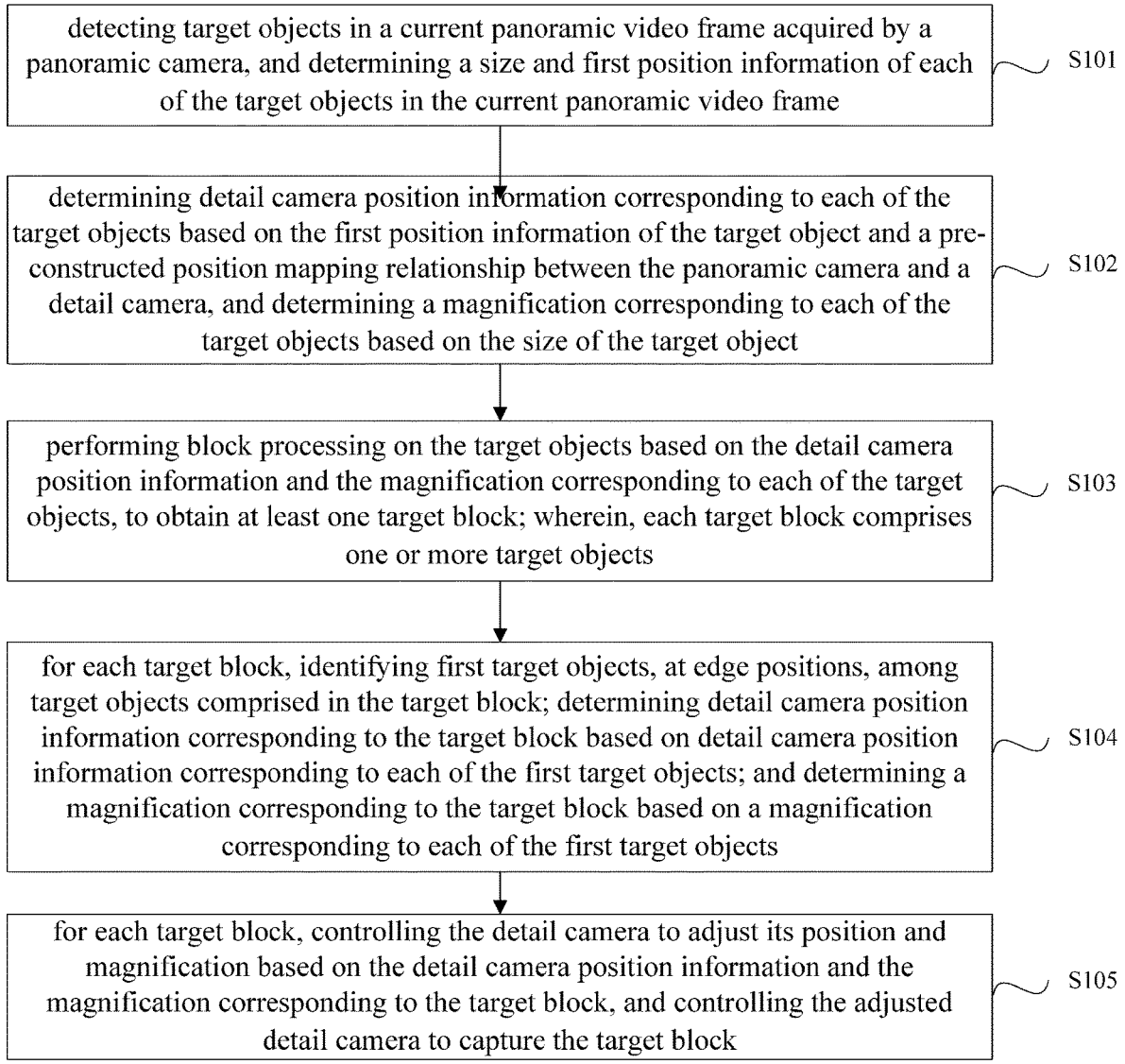
FIG. 1 is a flowchart of a method for capturing a target object according to an embodiment of the present application.

Referring to FIG. 1, FIG. 1 shows a flowchart of a method for capturing a target object according to an embodiment of the present application. The method may include the following steps.

At S101, target objects in a current panoramic video frame acquired by a panoramic camera is detected, and a size and first position information of each of the target objects in the current panoramic video frame are determined.

The method according to the embodiment of the present application may be applied to a video monitoring device. Specifically, the video monitoring device in the embodiment of the present application may include at least a panoramic camera, a detail camera and a processor. The panoramic camera may be a camera with a large monitoring range, such as a gun camera, a fish-eye camera, or the like. The detail camera may be a camera capable of adjusting a capturing/shooting magnification, such as a ball camera, or the like. In addition, the position of the detail camera may also be adjusted, so that the monitoring range of the detail camera and sizes of the target objects in the acquired image may be adjusted.

In the embodiment of the present application, the panoramic camera may acquire a panoramic video frame. For example, the panoramic camera may periodically acquire a panoramic video frame in a preset time interval. In addition, the panoramic camera may send the acquired current panoramic video frame to the processor.

After receiving the current panoramic video frame sent by the panoramic camera, the processor may detect a target object in the current panoramic video frame. For example, the processor may use a target detection algorithm such as DPM (Deformable Parts Model) or FRCNN (Faster Region Convolutional Neural Network) to detect the target object in the current panoramic video frame. The target object may be a person, a vehicle, or the like. In the embodiment of the present application, a person is taken as an example of the target object to describe the method for capturing a target object according to the embodiment of the present application.

Figure 2:
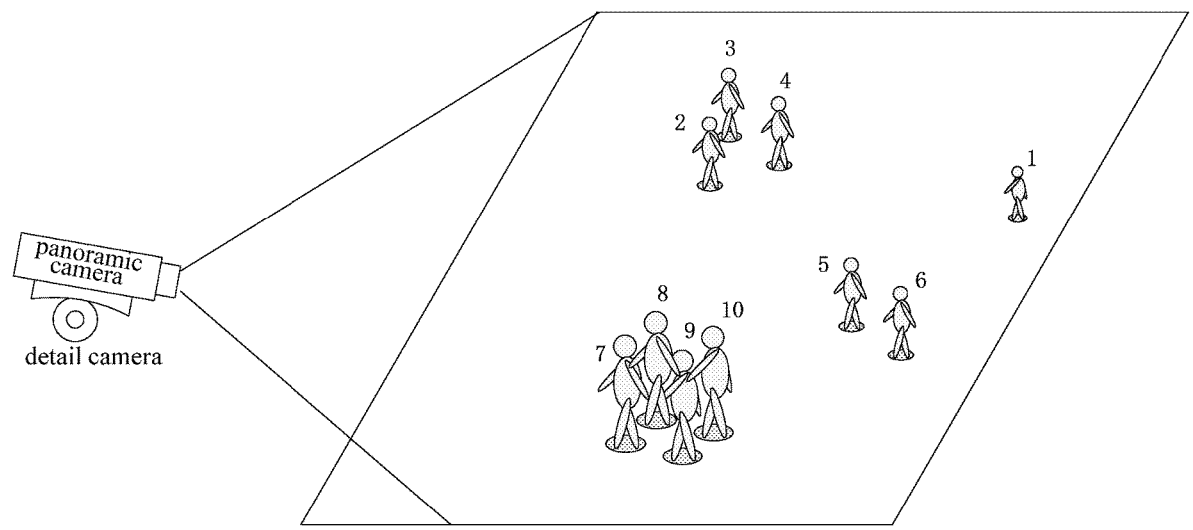
FIG. 2 is a schematic diagram of a panoramic video frame according to an embodiment of the present application.

Referring to FIG. 2, FIG. 2 shows a schematic diagram of a current panoramic video frame acquired by a panoramic camera. As shown in FIG. 2, the current panoramic video frame acquired by the panoramic camera includes target objects 1, 2, 3, 4, 5, 6, 7, 8, 9 and 10.

After detecting the target objects, the processor may also determine the first position information and the size of each of the target objects in the current panoramic video frame. For example, the processor may determine, for each of the target objects, a rectangular region where the target object is located, and determine, based on a preset coordinate system, the upper left coordinates and the lower right coordinates of the rectangular region as the first position information of the target object. Accordingly, the processor may determine the size of the rectangular region where the target object is located as the size of the target object.

Figure 3:
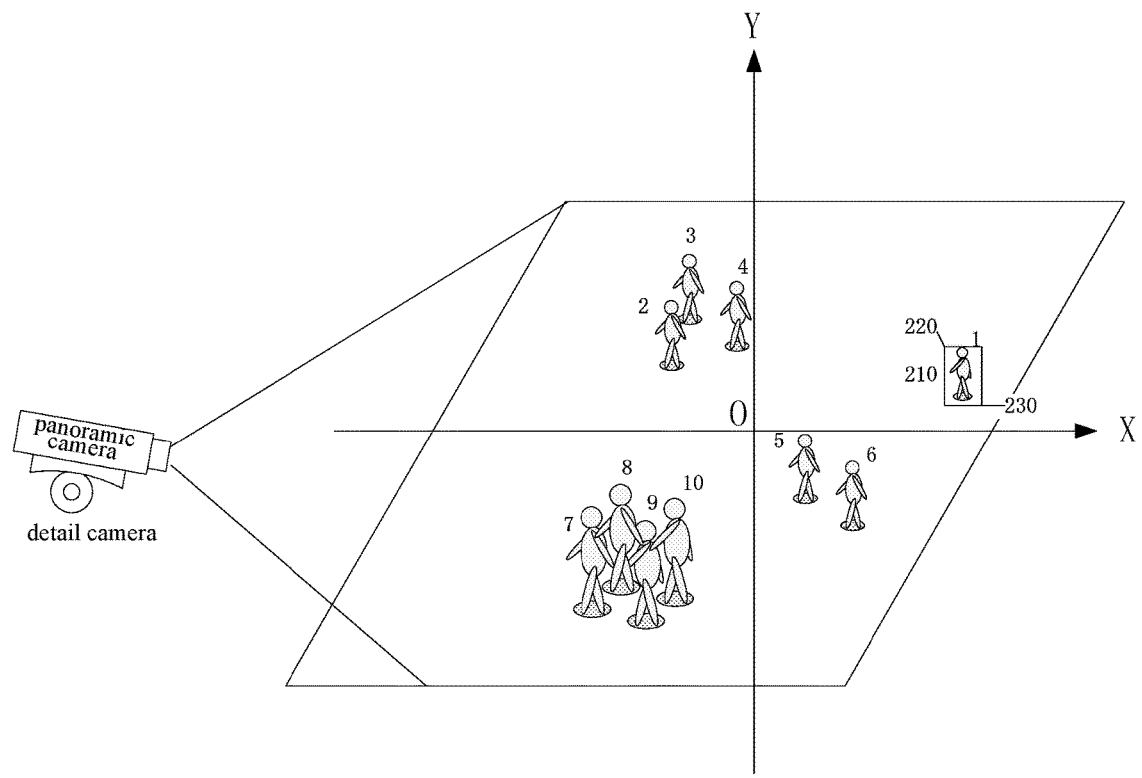
FIG. 3 is a schematic diagram of position information of target objects in a panoramic video frame according to an embodiment of the present application.

As shown in FIG. 3, for the target object 1, it can be determined that the rectangular region where the target object 1 is located is 210, and based on a coordinate system constructed in FIG. 3, the first position information of the target object 1 may be coordinates of an upper left corner 220 and of a lower right corner 230 of the region 210. The size of the target object 1 may be the size of the region 210.

At S102, detail camera position information corresponding to each of the target objects is determined based on the first position information of the target object and a pre-constructed position mapping relationship between the panoramic camera and a detail camera, and a magnification corresponding to each of the target objects is determined based on the size of the target object.

In the embodiment of the present application, a position mapping relationship between a panoramic camera and a detail camera may be pre-constructed. For example, when position information of any target object in the panoramic video frame acquired by the panoramic camera is a1, position information of the detail camera corresponding to the target object is b1; when position information of any target object in the panoramic video frame acquired by the panoramic camera is a2, position information of the detail camera corresponding to the target object is b2, and so on. The position information of the detail camera may include position information in a horizontal direction and position information in a vertical direction.

After determining the first position information of each of the target objects, the processor may determine the detail camera position information corresponding to each of the target objects based on the first position information of the target object and the pre-constructed position mapping relationship between the panoramic camera and the detail camera. In other words, the position of the detail camera when capturing each of the target objects is determined.

For example, for any one of the target objects, the processor may search for the first position information of the target object in the pre-constructed position mapping relationship between the panoramic camera and the detail camera, and use the position information of the detail camera corresponding to the first position information as the detail camera position information corresponding to the target object.

In the embodiment of the present application, in order to capture a target object clearly, the magnification of the detail camera may be adjusted. Specifically, the processor may determine the magnification corresponding to each of the target objects based on the size of the target object.

Generally, a standard for recognizable detail is that a pixel width of a person in an image reaches 240 pixels. Based on this standard, the processor may determine magnifications corresponding to different sizes of target objects. For example, for a larger target object, the magnification of the detail camera may be adjusted to a smaller value to capture a complete target object. For a smaller target object, the magnification of the detail camera may be adjusted to a larger value to obtain as large a target object as possible, thereby increasing the definition of the target object.

In an implementation, for each of the target objects, the processor may determine a corresponding angle of view based on the size of the target object, and may thus determine a magnification corresponding to the angle of view based on a preset correspondence between magnifications and angles of view, and use the determined magnification as the magnification corresponding to the target object.

At S103, based on the detail camera position information and the magnification corresponding to each of the target objects, block processing is performed on the target objects to obtain at least one target block; wherein, each target block includes one or more target objects.

In the embodiment of the present application, the processor may perform the block processing on the target objects to obtain at least one target block, based on the detail camera position information and the magnification corresponding to each of the target objects; wherein, each target block includes one or more target objects.

The detail camera corresponds to different position ranges at different magnifications. After the detail camera position information and the magnification corresponding to each of the target objects are obtained, all target objects whose magnifications are within a certain range of magnification (for example, 0.5 times) and that meet a position range of the detail camera are found and grouped into one block, so as to form finally different target blocks.

Figure 4:
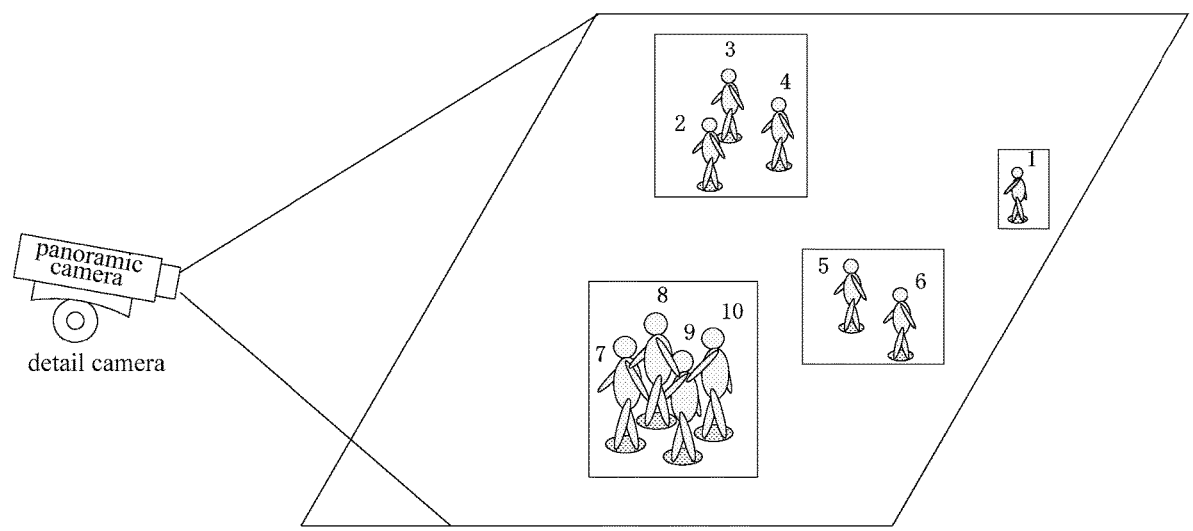
FIG. 4 is a schematic diagram of a result of blocking a target object according to an embodiment of the present application.

Referring to FIG. 4, after the block processing is performed on the target objects in the panoramic video frame shown in FIG. 2, each of the obtained target blocks may be as shown in FIG. 4. As shown in FIG. 4, all of the target objects may be divided into 4 blocks, with target objects 7, 8, 9, 10 as one block, target objects 2, 3, 4 as one block, target objects 5, 6 as one block, and target object 1 as one block.

At S104, for each target block, first target objects at edge positions are identified among target objects included in the target block; detail camera position information corresponding to the target block is determined based on detail camera position information corresponding to each of the first target objects; and a magnification corresponding to the target block is determined based on a magnification corresponding to each of the first target objects.

After obtaining multiple target blocks, the processor may further determine the detail camera position information and the magnification corresponding to each of the target blocks. Specifically, the processor may firstly, for each of the target blocks, identify first target objects at edge positions among all of target objects included in the target block.

Figure 5:
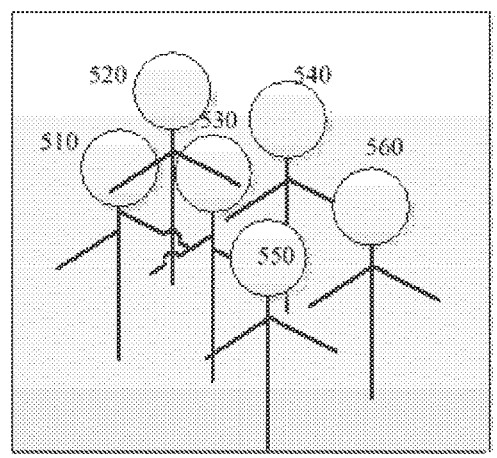
FIG. 5 is a schematic diagram of a result of determining a first target object in a target block according to an embodiment of the present application.

As shown in FIG. 5, FIG. 5 shows a schematic diagram of a target block including multiple target objects. As shown in FIG. 5, for the target block, the processor may identify that the first target objects at the edge positions are target objects 510, 520, 550 and 560, respectively.

After identifying the first target objects at the edge positions in each target block, the processor may determine the detail camera position information corresponding to the target block based on the detail camera position information corresponding to each of the first target objects, and determine the magnification corresponding to the target block based on the magnification corresponding to each of the first target objects.

For example, a maximum magnification in the magnifications corresponding to the first target objects may be used as the magnification corresponding to the target block, or a comprehensive magnification obtained by multiplying a magnification of each of the first target objects by a corresponding weight may be used as the magnification corresponding to the target block.

At S105, for each target block, the detail camera is controlled to adjust its position and magnification based on the detail camera position information and the magnification corresponding to the target block, and the adjusted detail camera is controlled to capture the target block.

After obtaining the detail camera position information and the magnification corresponding to the target blocks, for each of the target blocks, the processor may control the detail camera to adjust its position and magnification based on the detail camera position information and the magnification corresponding to the target block, and control the adjusted detail camera to capture the target block.

For example, for each of the target blocks, the processor may send to the detail camera a capturing instruction including the detail camera position information and the magnification corresponding to the target block. After receiving the capturing instruction, the detail camera may adjust its own position and magnification based on the detail camera position information and the magnification included in the instruction, and capture the target block.

In the embodiment of the present application, when target objects in the panoramic camera are detected, the block processing can be performed on the target objects to obtain multiple target blocks; and for each of the target blocks, the detail camera can be adjusted based on the position information, size and the like of the target object(s) included in the target block, so that the detail camera captures this target block through a position and magnification corresponding to this target block. In this way, it is possible to improve the capturing efficiency and the definition of target objects on the premise of ensuring the monitoring range.

As an implementation of the embodiment of the present application, in order to improve the capturing efficiency of target objects, in detecting target objects in a current panoramic video frame, the processor may detect target objects that are present in the current panoramic video frame but not present in a previous panoramic video frame acquired by the panoramic camera.

It can be understood that the similarity of a same target object in adjacent panoramic video frames is generally high. Therefore, for a same target object appearing in adjacent panoramic video frames, details thereof may be captured only once, thereby improving the capturing efficiency of the target object.

As an implementation of the embodiment of the present application, in order to better capture each of the target blocks, for example, capture each of the target blocks and capture the front face of each target object in the target block, the processor may prioritize the target blocks, and then capture each of the target blocks in priority order.

Figure 6:
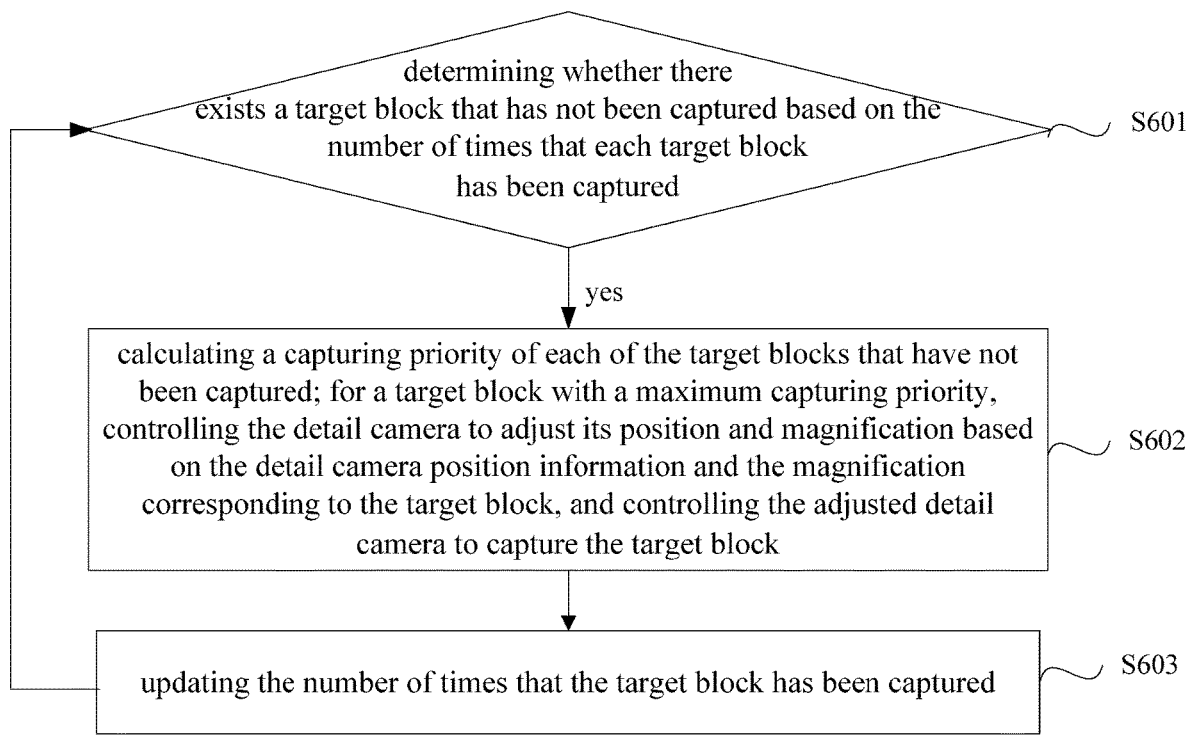
FIG. 6 is another flowchart of a method for capturing a target object according to an embodiment of the present application.

Specifically, before capturing each of the target blocks, the processor may set an initial value for the number of times that each of the target blocks has been captured, such as 0. In capturing each of the target blocks, as shown in FIG. 6, the processor may perform the following steps.

At S601, it is determined whether there exists a target block that has not been captured based on the number of times that each target block has been captured, and if there are target blocks that have not been captured, step S602 is performed.

In the embodiment of the present application, the processor may determine whether there exists a target block that has not been captured based on the number of times that each target blocks has been captured. For example, when the number of times that at least one target block is captured is 0, it may be determined that there is at least one target block that has not been captured. When the number of times that each target block has been captured is not zero, it may be determined that there is no target block that has not been captured.

At S602, a capturing priority of each of the target blocks that have not been captured is calculated; for a target block with a maximum capturing priority, the detail camera is controlled to adjust its position and magnification based on the detail camera position information and the magnification corresponding to the target block, and the adjusted detail camera is controlled to capture the target block.

In the embodiment of the present application, the processor may calculate the capturing priority of each of the target blocks that has not been captured. For example, for each of the target blocks that has not been captured, the processor may calculate the capturing priority of the target block based on attribute information and a weight corresponding to attribute information of each of target objects included in the target block and/or a position difference between a position of the target block and a position of a last captured target block and a weight corresponding to the position difference. The attribute information of a target object includes at least one of: a moving direction, the number of times that this target object has been captured and leaving time.

The moving direction of the target object may be a direction of the target object being directly toward the panoramic camera, or a direction of the target object being not directly toward the panoramic camera. The leaving time is time when the target object leaves the panoramic camera monitoring scene. The position difference between a position of the target block and a position of a last captured target block is a distance between the target block and the last captured target block in the panoramic video frame.

In the case that, for each of the target blocks that has not been captured, the processor calculates the capturing priority of the target block based on attribute information and a weight corresponding to attribute information of each of target objects included in the target block and a position difference between a position of the target block and a position of a last captured target block and a weight corresponding to the position difference, and the attribute information of any target object includes at least one of: a moving direction, the number of times that the target object has been captured and leaving time, before calculating the capturing priority of each of the target blocks that has not been captured, the processor may determine, for each of the target blocks that has not been captured, the moving direction and the leaving time of each of target objects included in the target block and the position difference between the position of the target block and the position of the last-captured target block.

Specifically, the processor may detect each of the target objects included in the target block, to determine whether the moving direction of each of the target objects is a direction of the target object being directly toward the panoramic camera or a direction of target object being not directly toward the panoramic camera. For example, the processor may use a target detection algorithm such as DPM or FRCNN to determine the moving direction of each of the target objects.

The processor may determine speed information of each of the target objects included in the target block, and determine the leaving time of each of the target objects included in the target block based on the first position information, the moving direction and the speed information of the target object in the current panoramic video frame.

In order to determine speed information of any target object, the processor may first determine whether the target object exists in a previously acquired panoramic video frame, for example, in a previous video frame; if the target object exists in a previously acquired panoramic video frame, the processor may determine the speed information of the target object based on multiple video frames. Further, for any target object, the processor may determine the distance of the target object from the edge of the monitoring scene based on the first position information and the moving direction of the target object, and then calculate the leaving time of the target object based on the distance and the speed information of the target object.

The processor may determine the position difference between the position of the target block and the position of the last captured target block, based on the first position information of the target block in the current panoramic video frame and the first position information of the last captured target block in the current panoramic video frame.

After obtaining the moving direction and the leaving time of each of the target objects, and the position difference between the position of the target block and the position of the last captured target block, the processor may calculate the capturing priority W of the target block by the following formula:

$$W = \sum_{1}^{n} \left( fw_1 + \frac{1}{c+1}w_2 + \frac{1}{t+0.01}w_3 \right) + \frac{1}{d+0.01}w_4,$$

wherein, n is the number of target objects included in the target block; f is the moving direction of any one of the target objects; when the moving direction of the target object is a direction of the target object being directly toward the panoramic camera, f=1; when the moving direction of the target object is a direction of the target object being not directly toward the panoramic camera, f=0; $w_1$ is a weight corresponding to the moving direction; c is the number of times that the target object has been captured; $w_2$ is a weight corresponding to the number of times that the target object has been captured; t is leaving time of the target object; $w_3$ is a weight corresponding to the leaving time; d is a position difference between a position of the target block and a position of the last captured target block; and $w_4$ is a weight corresponding to the position difference.

The weights may be preset and stored in the processor. In addition, the weights may be set based on actual application requirements, which is not limited in the embodiment of the present application.

After obtaining a capturing priority of each of the target blocks that has not been captured, for a target block with a maximum capturing priority, the processor may control the detail camera to adjust its position and magnification based on the detail camera position information and the magnification corresponding to the target block, and control the adjusted detail camera to capture the target block.

At S603, the number of times that the target block has been captured is updated, and it is returned to step S601.

After capturing the target block with a maximum capturing priority, the processor may update the number of times that the target block has been captured, for example, update the number of times that the target block has been captured to 1, and return to step S601, to capture a next target block that has not been captured.

In the embodiment, the processor may determine the capturing priority of each of the target blocks, and then capture each of the target blocks in sequence based on the capturing priority of each of the target blocks. When the capturing priority of each of the target blocks is calculated based on the moving direction and the leaving time of each of the target objects included in the target block and the position difference between the position of the target block and the position of the last captured target block, a target block with a higher capturing priority includes a target object moving directly toward the panoramic camera, a target object with short leaving time and a target object that has not been captured, and is closer to the last captured target block. In this way, it is possible to ensure the higher definition of all of target objects in the captured target block and the higher capturing efficiency, and ensure that the target objects are captured as much as possible.

Figure 7:
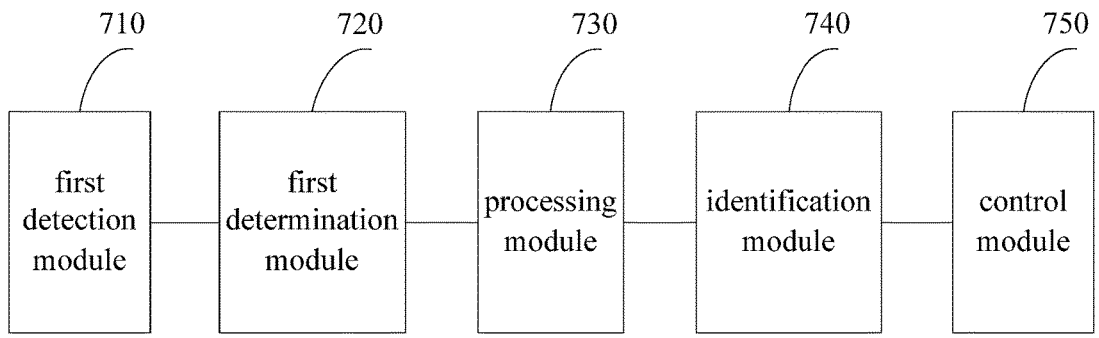
FIG. 7 is schematic structural diagram of an apparatus for capturing a target object according to an embodiment of the present application.

Correspondingly, an embodiment of the present application further provides an apparatus for capturing a target object. As shown in FIG. 7, the apparatus includes:

a first detection module 710, configured for: detecting target objects in a current panoramic video frame acquired by a panoramic camera, and determining a size and first position information of each of the target objects in the current panoramic video frame;

a first determination module 720, configured for: determining detail camera position information corresponding to each of the target objects based on the first position information of the target object and a pre-constructed position mapping relationship between the panoramic camera and a detail camera, and determining a magnification corresponding to each of the target objects based on the size of the target object;

a processing module 730, configured for: performing block processing on the target objects based on the detail camera position information and the magnification corresponding to each of the target objects, to obtain at least one target block; wherein, each target block comprises one or more target objects;

an identification module 740, configured for: for each target block, identifying first target objects, at edge positions, among target objects comprised in the target block; determining detail camera position information corresponding to the target block based on detail camera position information corresponding to each of the first target objects; and determining a magnification corresponding to the target block based on a magnification corresponding to each of the first target objects; and a control module 750, configured for: for each target block, controlling the detail camera to adjust its position and magnification based on the detail camera position information and the magnification corresponding to the target block, and controlling the adjusted detail camera to capture the target block.

In the embodiment of the present application, when target objects in the panoramic camera are detected, the block processing can be performed on the target objects to obtain multiple target blocks; and for each of the target blocks, the detail camera can be adjusted based on the position information, size and the like of the target object(s) included in the target block, so that the detail camera captures this target block through a position and magnification corresponding to this target block. In this way, it is possible to improve the capturing efficiency and the definition of target objects on the premise of ensuring the monitoring range.

As an implementation of the embodiment of the present application, the first determination module 720 includes:

a first determination submodule (not shown in the figure), configured for: for each of the target objects, determining a corresponding angle of view based on the size of the target object, and a second determination submodule (not shown in the figure), configured for: determining a magnification corresponding to the angle of view based on a preset correspondence between magnifications and angles of view, and using the determined magnification as the magnification corresponding to the target object.

As an implementation of the embodiment of the present application, the apparatus further includes:

a setting module (not shown in the figure), configured for: setting an initial value for the number of times that each target block has been captured;

the control module 750 includes:

a judgment submodule (not shown in the figure), configured for: determining whether there exists a target block that has not been captured based on the number of times that each target block has been captured;

a control submodule (not shown in the figure), configured for: when the judgment submodule determines that there are target blocks that have not been captured, calculating a capturing priority of each of the target blocks that have not been captured; for a target block with a maximum capturing priority, controlling the detail camera to adjust its position and magnification based on the detail camera position information and the magnification corresponding to the target block, and controlling the adjusted detail camera to capture the target block; and an update submodule (not shown in the figure), configured for: updating the number of times that the target block has been captured, and triggering the judgment submodule.

As an implementation of the embodiment of the present application, the control submodule is specifically configured for: for each of the target blocks that have not been captured, calculating the capturing priority of the target block based on attribute information and a weight corresponding to the attribute information of each of target objects comprised in the target block and/or a position difference between a position of the target block and a position of a last captured target block and a weight corresponding to the position difference; wherein, the attribute information of any one of the target objects comprises at least one of: a moving direction, the number of times that this target object has been captured and leaving time.

As an implementation of the embodiment of the present application, in case that the control submodule is specifically configured for: for each of the target blocks that have not been captured, calculating the capturing priority of the target block based on the attribute information and the weight corresponding to the attribute information of each of the target objects comprised in the target block and the position difference between the position of the target block and the position of the last captured target block and the weight corresponding to the position difference, and the attribute information of any one of the target objects comprises the moving direction, the number of times that this target object has been captured and the leaving time, the apparatus further comprises:

a second detection module (not shown in the figure), configured for: detecting each of the target objects comprised in the target block, to determine that the moving direction of each of the target objects is a direction of the target object being directly toward the panoramic camera or a direction of the target object being not directly toward the panoramic camera;

a second determination module (not shown in the figure), configured for: determining speed information of each of the target objects comprised in the target block, and determining the leaving time of each of the target objects comprised in the target block based on the moving direction, the speed information and the first position information of this target object in the current panoramic video frame; and a third determination module (not shown in the figure), configured for: determining the position difference between the position of the target block and the position of the last captured target block based on the first position information of the target block in the current panoramic video frame and first position information of the last captured target block in the current panoramic video frame.

As an implementation of the embodiment of the present application, the control submodule is specifically configured for: for any one of the target blocks that have not been captured, calculating the capturing priority W of the target block by the following formula:

$$W = \sum_{1}^{n}\left(fw_1 + \frac{1}{c+1}w_2 + \frac{1}{t+0.01}w_3\right) + \frac{1}{d+0.01}w_4,$$

wherein, n is the number of target objects comprised in the target block; f is a moving direction of any one of the target objects; when the moving direction of the target object is a direction of the target object being directly toward the panoramic camera, $f=1$; when the moving direction of the target object is a direction of the target object being not directly toward the panoramic camera, $f=0$; $w_1$ is a weight corresponding to the moving direction; c is the number of times that the target object has been captured; $w_2$ is a weight corresponding to the number of times that the target object has been captured; t is leaving time of the target object; $w_3$ is a weight corresponding to the leaving time; d is a position difference between a position of the target block and a position of a last captured target block; and $w_4$ is a weight corresponding to the position difference.

As an implementation of the embodiment of the present application, the first determination module is specifically configured for: using a maximum value in the magnifications corresponding to the first target objects as the magnification corresponding to the target block, or using a comprehensive magnification obtained by multiplying the magnification of each of the first target objects by a corresponding weight as the magnification corresponding to the target block.

As an implementation of the embodiment of the present application, the first detection module is configured for: detecting target objects that are present in the current panoramic video frame but not present in a previous panoramic video frame acquired by the panoramic camera.

Figure 8:
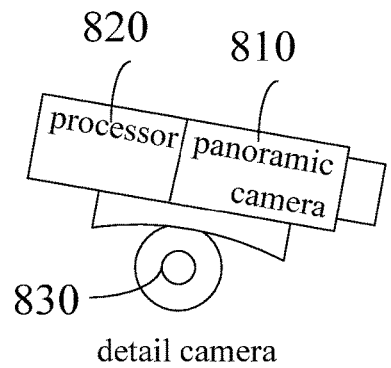
FIG. 8 is a schematic structural diagram of a video monitoring device according to an embodiment of the present application.

Correspondingly, an embodiment of the present application further provides a video monitoring device, as shown in FIG. 8, including a panoramic camera 810, a processor 820 and a detail camera 830.

The panoramic camera 810 is configured for: acquiring a current panoramic video frame and sending the current panoramic video frame to the processor 820.

The processor 820 is configured for: detecting target objects in the current panoramic video frame, and determining a size and first position information of each of the target objects in the current panoramic video frame; determining detail camera position information corresponding to each of the target objects based on the first position information of the target object and a pre-constructed position mapping relationship between the panoramic camera and the detail camera, and determining a magnification corresponding to each of the target objects based on the size of the target object; performing block processing on the target objects based on the detail camera position information and the magnification corresponding to each of the target objects, to obtain at least one target block; wherein, each target block comprises one or more target objects; for each target block, identifying first target objects, at edge positions, among target objects comprised in the target block; determining detail camera position information corresponding to the target block based on detail camera position information corresponding to each of the first target objects; and determining a magnification corresponding to the target block based on a magnification corresponding to each of the first target objects; and for each target block, sending the detail camera position information and the magnification corresponding to the target block to the detail camera.

The detail camera 830 is configured for: adjusting its own position and magnification based on received detail camera position information and magnification corresponding to the target block, and capturing the target block.

In the embodiment of the present application, when target objects in the panoramic camera are detected, the block processing can be performed on the target objects to obtain multiple target blocks; and for each of the target blocks, the detail camera can be adjusted based on the position information, sizes and the like of the target object(s) included in the target block, so that the detail camera captures this target block through a position and magnification corresponding to this target block. In this way, it is possible to improve the capturing efficiency and the definition of target objects on the premise of ensuring the monitoring range.

As an implementation of the embodiment of the present application, the processor 820 is specifically configured for: for each of the target objects, determining, based on the size of the target object, a corresponding angle of view; and determining a magnification corresponding to the angle of view based on a preset correspondence between magnifications and angles of view, and using the determined magnification as the magnification corresponding to the target object.

As an implementation of the embodiment of the present application, the processor 820 is further configured for: setting an initial value for the number of times that each target block has been captured.

The processor 820 is specifically configured for: determining whether there exists a target block that has not been captured based on the number of times that each target block has been captured; if there are target blocks that have not been captured, calculating a capturing priority of each of the target blocks that have not been captured; for a target block with a maximum capturing priority, sending the detail camera position information and the magnification corresponding to the target block to the detail camera 830; updating the number of times that the target block has been captured, and returning to the determining whether there exists a target block that has not been captured based on the number of times that each target block has been captured.

The detail camera 830 is specifically configured for: adjusting its own position and magnification based on received detail camera position information and magnification corresponding to the target block, and capturing the target block.

As an implementation of the embodiment of the present application, the processor 820 is specifically configured for: for each of the target blocks that have not been captured, calculating the capturing priority of the target block based on attribute information and a weight corresponding to the attribute information of each of target objects comprised in the target block and/or a position difference between a position of the target block and a position of a last captured target block and a weight corresponding to the position difference; wherein, the attribute information of any one of the target objects comprises at least one of: a moving direction, the number of times that this target object has been captured and leaving time.

As an implementation of the embodiment of the present application, in case that the processor 820, for each of the target blocks that have not been captured, calculates the capturing priority of the target block based on the attribute information and the weight corresponding to the attribute information of each of the target objects comprised in the target block and the position difference between the position of the target block and the position of the last captured target block and the weight corresponding to the position difference, and the attribute information of any one of the target objects comprises the moving direction, the number of times that this target object has been captured and the leaving time, the processor 820 is further configured for: detecting each of the target objects comprised in the target block, to determine that the moving direction of each of the target objects is a direction of the target object being directly toward the panoramic camera or a direction of the target object being not directly toward the panoramic camera; determining speed information of each of the target objects comprised in the target block, and determining the leaving time of each of the target objects comprised in the target block based on the moving direction, the speed information and the first position information of this target object in the current panoramic video frame; and determining the position difference between the position of the target block and the position of the last captured target block based on the first position information of the target block in the current panoramic video frame and the first position information of the last captured target block in the current panoramic video frame.

As an implementation of the embodiment of the present application, the processor 820 is specifically configured for: for any one of the target blocks that have not been captured, calculating the capturing priority W of the target block by the following formula:

$$W = \sum_{1}^{n}\left(fw_1 + \frac{1}{c+1}w_2 + \frac{1}{t+0.01}w_3\right) + \frac{1}{d+0.01}w_4,$$

wherein, n is the number of target objects comprised in the target block; f is a moving direction of any one of the target objects; when the moving direction of the target object is a direction of the target object being directly toward the panoramic camera, f=1; when the moving direction of the target object is a direction of the target object being not directly toward the panoramic camera, f=0; $w_1$ is a weight corresponding to the moving direction; c is the number of times that the target object has been captured; $w_2$ is a weight corresponding to the number of times that the target object has been captured; t is leaving time of the target object; $w_3$ is a weight corresponding to the leaving time; d is a position difference between a position of the target block and a position of a last captured target block; and $w_4$ is a weight corresponding to the position difference.

As an implementation of the embodiment of the present application, the processor 820 is specifically configured for: using a maximum value in the magnifications corresponding to the first target objects as the magnification corresponding to the target block, or using a comprehensive magnification obtained by multiplying the magnification of each of the first target objects by a corresponding weight as the magnification corresponding to the target block.

As an implementation of the embodiment of the present application, the processor 820 is configured for: detecting target objects that are present in the current panoramic video frame but not present in a previous panoramic video frame acquired by the panoramic camera.

Correspondingly, an embodiment of the present application further provides a storage medium. The storage medium is configured for storing executable program codes which, when executed, implement the method for capturing a target object according to the embodiment of the present application. The method for capturing a target object includes:

detecting target objects in a current panoramic video frame acquired by a panoramic camera, and determining a size and first position information of each of the target objects in the current panoramic video frame;

determining detail camera position information corresponding to each of the target objects based on the first position information of the target object and a pre-constructed position mapping relationship between the panoramic camera and a detail camera, and determining a magnification corresponding to each of the target objects based on the size of the target object;

performing block processing on the target objects based on the detail camera position information and the magnification corresponding to each of the target objects, to obtain at least one target block; wherein, each target block comprises one or more target objects;

for each target block, identifying first target objects, at edge positions, among target objects comprised in the target block; determining detail camera position information corresponding to the target block based on detail camera position information corresponding to each of the first target objects; and determining a magnification corresponding to the target block based on a magnification corresponding to each of the first target objects; and for each target block, controlling the detail camera to adjust its position and magnification based on the detail camera position information and the magnification corresponding to the target block, and controlling the adjusted detail camera to capture the target block.

In the embodiment of the present application, when target objects in the panoramic camera are detected, the block processing can be performed on the target objects to obtain multiple target blocks; and for each of the target blocks, the detail camera can be adjusted based on the position information, size and the like of the target object(s) included in the target block, so that the detail camera captures this target block through a position and magnification corresponding to this target block. In this way, it is possible to improve the capturing efficiency and the definition of target objects on the premise of ensuring the monitoring range.

Correspondingly, an embodiment of the present application further provides an application program which, when executed, implements the method for capturing a target object according to the embodiment of the present application. The method for capturing a target object includes:

detecting target objects in a current panoramic video frame acquired by a panoramic camera, and determining a size and first position information of each of the target objects in the current panoramic video frame;

determining detail camera position information corresponding to each of the target objects based on the first position information of the target object and a pre-constructed position mapping relationship between the panoramic camera and a detail camera, and determining a magnification corresponding to each of the target objects based on the size of the target object;

performing block processing on the target objects based on the detail camera position information and the magnification corresponding to each of the target objects, to obtain at least one target block; wherein, each target block comprises one or more target objects;

for each target block, identifying first target objects, at edge positions, among target objects comprised in the target block; determining detail camera position information corresponding to the target block based on detail camera position information corresponding to each of the first target objects; and determining a magnification corresponding to the target block based on a magnification corresponding to each of the first target objects; and for each target block, controlling the detail camera to adjust its position and magnification based on the detail camera position information and the magnification corresponding to the target block, and controlling the adjusted detail camera to capture the target block.

In the embodiment of the present application, when target objects in the panoramic camera are detected, the block processing can be performed on the target objects to obtain multiple target blocks; and for each of the target blocks, the detail camera can be adjusted based on the position information, size and the like of the target object(s) included in the target block, so that the detail camera captures this target block through a position and magnification corresponding to this target block. In this way, it is possible to improve the capturing efficiency and the definition of target objects on the premise of ensuring the monitoring range.

The embodiments of an apparatus/a video monitoring device/a storage medium/an application program are described briefly since they are substantially similar to the embodiment of the method. The related contents can refer to the description of the embodiment of the method.

It should be noted that the relationship terms used herein, such as "first", "second" and the like are only to distinguish one entity or operation from another entity or operation, but do not necessarily require or imply that there is an actual relationship or order between these entities or operations. Moreover, the terms "include", "comprise", or any other variants thereof are intended to cover a non-exclusive inclusion, such that processes, methods, articles or devices, including a series of elements, include not only those elements that have been listed, but also other elements that are not specifically listed or the elements intrinsic to these processes, methods, articles or devices. Without further limitations, elements limited by the wording "include(s) a/an . . . " or "comprise(s) a/an . . . " do not exclude additional identical elements in the processes, methods, articles or devices, including the listed elements.

All of the embodiments in the description are described in a correlated manner, and identical or similar parts in various embodiments can refer to one another. In addition, the description for each embodiment focuses on the differences from other embodiments. In particular, the embodiment of the apparatus is described briefly, since it is substantially similar to the embodiment of the method, and the related contents can refer to the description of the embodiment of the method.

It can be understood by those skills in the art that all or a part of steps of the above method may be accomplished by instructing related hardware through programs, which may be stored in a computer-readable storage medium, such as in ROM/RAM, a disk, an optical disk, and so on.

The above described embodiments are simply preferable embodiments of the present application, and are not intended to limit the scope of protection of the present application. Any modifications, alternatives, improvements, or the like within the spirit and principle of the present application shall be included within the scope of protection of the present application.

The invention claimed is:

1. A method for capturing a target object, comprising:
   detecting target objects in a current panoramic video frame acquired by a panoramic camera, and determining a size and first position information of each of the target objects in the current panoramic video frame;
   determining detail camera position information corresponding to each of the target objects based on the first position information of the target object and a pre-constructed position mapping relationship between the panoramic camera and a detail camera, and determining a magnification corresponding to each of the target objects based on the size of the target object;
   performing block processing on the target objects based on the detail camera position information and the magnification corresponding to each of the target objects, to obtain at least one target block; wherein, each target block comprises one or more target objects;
   for each target block, identifying one or more first target objects, at one or more edge positions, among the one or more target objects comprised in the target block; determining detail camera position information corresponding to the target block based on detail camera position information corresponding to each of the first target objects; and determining a magnification corresponding to the target block based on a magnification corresponding to each of the first target objects; and
   for each target block, controlling the detail camera to adjust its position and magnification based on the detail camera position information and the magnification corresponding to the target block, and controlling the adjusted detail camera to capture the target block.

2. The method of claim 1, wherein, the step of determining a magnification corresponding to each of the target objects based on the size of the target object, comprises:
   for each of the target objects, determining, based on the size of the target object, a corresponding angle of view; and
   determining a magnification corresponding to the angle of view based on a preset correspondence between magnifications and angles of view, and using the determined magnification as the magnification corresponding to the target object.

3. The method of claim 1, wherein, before, for each target block, controlling the detail camera to adjust its position and magnification based on the detail camera position information and the magnification corresponding to the target block, and controlling the adjusted detail camera to capture the target block, the method further comprises:
   setting an initial value for the number of times that each target block has been captured;
   the step of, for each target block, controlling the detail camera to adjust its position and magnification based on the detail camera position information and the magnification corresponding to the target block, and controlling the adjusted detail camera to capture the target block, comprises:
   determining whether there exists a target block that has not been captured based on the number of times that each target block has been captured;
   if there are target blocks that have not been captured, calculating a capturing priority of each of the target blocks that have not been captured; for a target block with a maximum capturing priority, controlling the detail camera to adjust its position and magnification based on the detail camera position information and the magnification corresponding to the target block, and controlling the adjusted detail camera to capture the target block; and
   updating the number of times that the target block has been captured, and returning to the step of determining whether there exists a target block that has not been captured based on the number of times that each target block has been captured.

4. The method of claim 3, wherein, the step of calculating a capturing priority of each of the target blocks that have not been captured, comprises:
   for each of the target blocks that have not been captured, calculating the capturing priority of the target block based on attribute information and a weight corresponding to the attribute information of each of target objects comprised in the target block and/or a position difference between a position of the target block and a position of a last captured target block and a weight corresponding to the position difference; wherein, the attribute information of any one of the target objects comprises at least one of: a moving direction, the number of times that this target object has been captured and leaving time.

5. The method of claim 4, wherein, in case that for each of the target blocks that have not been captured, the capturing priority of the target block is calculated based on the attribute information and the weight corresponding to the attribute information of each of the target objects comprised in the target block and the position difference between the position of the target block and the position of the last captured target block and the weight corresponding to the position difference, and the attribute information of any one of the target objects comprises the moving direction, the number of times that this target object has been captured and the leaving time, before for each of the target blocks that have not been captured, calculating the capturing priority of the target block based on the attribute information and the weight corresponding to the attribute information of each of the target objects comprised in the target block and the position difference between the position of the target block and the position of the last captured target block and the weight corresponding to the position difference, the method further comprises:
   detecting each of the target objects comprised in the target block, to determine that the moving direction of each of the target objects is a direction of the target object being directly toward the panoramic camera or a direction of the target object being not directly toward the panoramic camera;
   determining speed information of each of the target objects comprised in the target block, and determining the leaving time of each of the target objects comprised in the target block based on the moving direction, the speed information and the first position information of this target object in the current panoramic video frame; and
   determining the position difference between the position of the target block and the position of the last captured target block based on the first position information of the target block in the current panoramic video frame and the first position information of the last captured target block in the current panoramic video frame.

6. The method of claim 5, wherein, the step of, for each of the target blocks that have not been captured, calculating the capturing priority of the target block based on the attribute information and the weight corresponding to the attribute information of each of the target objects comprised in the target block and the position difference between the position of the target block and the position of the last captured target block and the weight corresponding to the position difference, comprises:

for any one of the target blocks that have not been captured, calculating the capturing priority W of the target block by the following formula:

$$W = \sum_{1}^{n}\left(fw_1 + \frac{1}{c+1}w_2 + \frac{1}{t+0.01}w_3\right) + \frac{1}{d+0.01}w_4,$$

wherein, n is the number of target objects comprised in the target block; f is a moving direction of any one of the target objects; when the moving direction of the target object is a direction of the target object being directly toward the panoramic camera, f=1; when the moving direction of the target object is a direction of the target object being not directly toward the panoramic camera, f=0; $w_1$ is a weight corresponding to the moving direction; c is the number of times that the target object has been captured; $w_2$ is a weight corresponding to the number of times that the target object has been captured; t is leaving time of the target object; $w_3$ is a weight corresponding to the leaving time; d is a position difference between a position of the target block and a position of a last captured target block; and $w_4$ is a weight corresponding to the position difference.

7. The method of claim 1, wherein, the step of determining a magnification corresponding to the target block based on a magnification corresponding to each of the first target objects, comprises:

using a maximum value in the magnifications corresponding to the first target objects as the magnification corresponding to the target block, or using a comprehensive magnification obtained by multiplying the magnification of each of the first target objects by a corresponding weight as the magnification corresponding to the target block.

8. The method of claim 1, wherein, the step of detecting target objects in a current panoramic video frame acquired by a panoramic camera, comprises:

detecting target objects that are present in the current panoramic video frame but not present in a previous panoramic video frame acquired by the panoramic camera.

9. A video monitoring device, comprising: a panoramic camera, a detail camera and a processor; wherein, the panoramic camera is configured for: acquiring a current panoramic video frame and sending the current panoramic video frame to the processor;

the processor is configured for: detecting target objects in the current panoramic video frame, and determining first position information and a size of each of the target objects in the current panoramic video frame; determining detail camera position information corresponding to each of the target objects based on the first position information of the target object and a pre-constructed position mapping relationship between the panoramic camera and the detail camera, and determining a magnification corresponding to each of the target objects based on the size of the target object; performing block processing on the target objects based on the detail camera position information and the magnification corresponding to each of the target objects, to obtain at least one target block; wherein, each target block comprises one or more target objects; for each target block, identifying one or more first target objects, at one or more edge positions, among the one or more target objects comprised in the target block; determining detail camera position information corresponding to the target block based on detail camera position information corresponding to each of the first target objects; and determining a magnification corresponding to the target block based on a magnification corresponding to each of the first target objects; and for each target block, sending the detail camera position information and the magnification corresponding to the target block to the detail camera; and the detail camera is configured for: adjusting its own position and magnification based on received detail camera position information and magnification corresponding to the target block, and capturing the target block.

10. The device of claim 9, wherein, the processor is specifically configured for: for each of the target objects, determining, based on the size of the target object, a corresponding angle of view; and determining a magnification corresponding to the angle of view based on a preset correspondence between magnifications and angles of view, and using the determined magnification as the magnification corresponding to the target object.

11. The device of claim 9, wherein, the processor is further configured for: setting an initial value for the number of times that each target block has been captured;

the processor is specifically configured for: determining whether there exists a target block that has not been captured based on the number of times that each target block has been captured; if there are target blocks that have not been captured, calculating a capturing priority of each of the target blocks that have not been captured; for a target block with a maximum capturing priority, sending the detail camera position information and the magnification corresponding to the target block to the detail camera; updating the number of times that the target block has been captured, and returning to the determining whether there exists a target block that has not been captured based on the number of times that each target block has been captured; and the detail camera is specifically configured for: adjusting its own position and magnification based on received detail camera position information and magnification corresponding to the target block, and capturing the target block.

12. The device of claim 11, wherein, the processor is specifically configured for: for each of the target blocks that have not been captured, calculating the capturing priority of the target block based on attribute information and a weight corresponding to the attribute information of each of target objects comprised in the target block and/or a position difference between a position of the target block and a position of a last captured target block and a weight corresponding to the position difference; wherein, the attribute information of any one of the target objects comprises at least one of: a moving direction, the number of times that this target object has been captured and leaving time.

13. The device of claim 12, wherein, in case that the processor, for each of the target blocks that have not been captured, calculates the capturing priority of the target block based on the attribute information and the weight corresponding to the attribute information of each of the target objects comprised in the target block and the position difference between the position of the target block and the position of the last captured target block and the weight corresponding to the position difference, and the attribute information of any one of the target objects comprises the moving direction, the number of times that this target object has been captured and the leaving time, the processor is further configured for: detecting each of the target objects comprised in the target block, to determine that the moving direction of each of the target objects is a direction of the target object being directly toward the panoramic camera or a direction of the target object being not directly toward the panoramic camera; determining speed information of each of the target objects comprised in the target block, and determining the leaving time of each of the target objects comprised in the target block based on the moving direction, the speed information and the first position information of this target object in the current panoramic video frame; and determining the position difference between the position of the target block and the position of the last captured target block based on the first position information of the target block in the current panoramic video frame and the first position information of the last captured target block in the current panoramic video frame.

14. The device of claim 13, wherein, the processor is specifically configured for: for any one of the target blocks that have not been captured, calculating the capturing priority W of the target block by the following formula:

$$W = \sum_{1}^{n}\left(fw_1 + \frac{1}{c+1}w_2 + \frac{1}{t+0.01}w_3\right) + \frac{1}{d+0.01}w_4,$$

wherein, n is the number of target objects comprised in the target block; f is a moving direction of any one of the target objects; when the moving direction of the target object is a direction of the target object being directly toward the panoramic camera, f=1; when the moving direction of the target object is a direction of the target object being not directly toward the panoramic camera, f=0; $w_1$ is a weight corresponding to the moving direction; c is the number of times that the target object has been captured; $w_2$ is a weight corresponding to the number of times that the target object has been captured; t is leaving time of the target object; $w_3$ is a weight corresponding to the leaving time; d is a position difference between a position of the target block and a position of a last captured target block; and $w_4$ is a weight corresponding to the position difference.

15. The device of claim 9, wherein, the processor is specifically configured for: using a maximum value in the magnifications corresponding to the first target objects as the magnification corresponding to the target block, or using a comprehensive magnification obtained by multiplying the magnification of each of the first target objects by a corresponding weight as the magnification corresponding to the target block.

16. A non-transitory storage medium for storing executable program codes; wherein, the executable program codes, when executed, implement the method for capturing a target object of claim 1.

* * * * *